United States Patent
Liu et al.

(10) Patent No.: US 8,254,510 B2
(45) Date of Patent: Aug. 28, 2012

(54) APPARATUS AND METHOD FOR INTER-CARRIER INTERFERENCE CANCELLATION

(75) Inventors: Jia-Wei Liu, Jhongli (TW);
Chorng-Ren Sheu, Kaohsiung (TW);
Ming-Chien Tseng, Zihguan Township, Kaohsiung County (TW)

(73) Assignee: Industrial Technology Research Institute, Hsinchu (TW)

( * ) Notice: Subject to any disclaimer, the term of this patent is extended or adjusted under 35 U.S.C. 154(b) by 490 days.

(21) Appl. No.: 12/645,670

(22) Filed: Dec. 23, 2009

(65) Prior Publication Data

US 2011/0150153 A1    Jun. 23, 2011

(51) Int. Cl.
  H03D 1/06      (2006.01)
  H03D 11/04     (2006.01)
  H03K 5/01      (2006.01)
  H03K 6/04      (2006.01)
  H04B 1/10      (2006.01)
  H04L 1/00      (2006.01)
  H04L 25/08     (2006.01)

(52) U.S. Cl. ........ 375/348; 375/260; 375/346; 375/354; 375/355; 370/208; 370/504

(58) Field of Classification Search .................. 375/260, 375/346, 348, 354, 355; 370/208, 504
See application file for complete search history.

(56) References Cited

U.S. PATENT DOCUMENTS

| | | | | |
|---|---|---|---|---|
| 7,746,940 B2 * | 6/2010 | Yeon et al. | | 375/260 |
| 7,773,683 B2 * | 8/2010 | Tseng et al. | | 375/260 |
| 8,000,417 B1 * | 8/2011 | Zhidkov et al. | | 375/346 |
| 2001/0016602 A1 * | 8/2001 | Liang et al. | | 514/520 |
| 2004/0091057 A1 * | 5/2004 | Yoshida | | 375/260 |
| 2005/0105659 A1 * | 5/2005 | Sheu et al. | | 375/360 |
| 2005/0249269 A1 * | 11/2005 | Tomasin et al. | | 375/148 |
| 2006/0239267 A1 * | 10/2006 | Ryu | | 370/392 |
| 2006/0239367 A1 | 10/2006 | Wilhelmsson et al. | | |
| 2008/0159420 A1 * | 7/2008 | Tseng et al. | | 375/260 |
| 2009/0059781 A1 * | 3/2009 | Tseng et al. | | 370/201 |
| 2009/0180560 A1 * | 7/2009 | Yamasuge | | 375/260 |

(Continued)

OTHER PUBLICATIONS

Shue, C., "A Low Complexity ICI Cancellation Scheme with Multi-Step Windowing and Modified SIC for High-Mobility OFDM Systems", 2010, Vehicular Technology Conference (VTC 2010-Spring), 2010 IEEE 71st, p. 1-5.*

(Continued)

*Primary Examiner* — Shuwang Liu
*Assistant Examiner* — Sung Ahn
(74) *Attorney, Agent, or Firm* — Thomas|Kayden

(57) ABSTRACT

A method for inter-carrier interference cancellation is provided. A time-domain received signal is detected to obtain information of an inter-symbol interference free region. Multiple cyclic useful symbols are obtained from the time-domain received signal according to the information of the inter-symbol interference free region and a set of multi-step windowing coefficients is generated. Adjusted cyclic useful symbols are obtained by multiplying the cyclic useful symbols by the set of multi-step windowing coefficients, respectively, and then combined in a time domain to obtain a time-domain combination signal. The inter-carrier interference of each of sub-carriers of the time-domain combination signal is centralized on neighboring D sub-carriers. The time-domain combination signal is transformed into a frequency-domain received signal. The frequency-domain received signal and its corresponding channel response matrix are divided into overlapped signal blocks according to D. Successive inter-carrier interference cancellation is performed on each signal block in parallel to obtain estimation data.

20 Claims, 8 Drawing Sheets

U.S. PATENT DOCUMENTS

2009/0274036 A1* 11/2009 Lin et al. .................. 370/208

OTHER PUBLICATIONS

Choi, Y.S., et al.; "On Channel Estimation and Detection for Multicarrier Signals in Fast and Selective Rayleigh Fading Channels;" IEEE Transactions on Communications; vol. 49, No. 8; Aug. 2001; pp. 1375-1387.

Kim, K., et al.; "A Low Complexity ICI Cancellation Method for High Mobility OFDM Systems," IEEE; 2006; pp. 2528-2532.

* cited by examiner

APPARATUS AND METHOD FOR INTER-CARRIER INTERFERENCE CANCELLATION

TECHNICAL FIELD

The invention relates in general to an apparatus and a method for inter-carrier interference cancellation.

BACKGROUND

In a wireless communication system, a transmitter transmits a wireless signal to a receiver through a physical channel, such as air, in the form of electromagnetic waves. Due to the unideal channel effect, such as multipath reflection and multipath fading, the wireless signal received by the receiver may get distorted.

Based on the orthogonal frequency division multiplexing (OFDM) modulation technology for the multi-carrier modulation, the effective processing ability is obtained with respect to the multipath reflection effect. In the OFDM systems, the receiver only needs one simple one-tap equalizer to equalize the frequency selective fading, which is caused by time invariant multipath channel. So, the OFDM system has recently become the mainstream technology in the communication field and the broadcasting application development. Various systems, such as the asymmetric digital subscriber line (ADSL), the power line communication (PLC), the digital audio broadcasting (DAB), the wireless local area network (WLAN) 802.11a/b/g/n, the China mobile multimedia broadcasting (CMMB), the digital video broadcasting-terrestrial (DVB-T), the digital video broadcasting-handheld (DVB-H) and the Wi-Max IEEE 802.16e with the mobility apparatus, use the OFDM transmission technology.

Nowadays, receivers of some OFDM systems (e.g., DVB-T, DVB-H, IEEE 802.16e, CMMB and the like) are emphasized to provide desirable capability of reception at the high speed motion. However, when the receiver of the OFDM system is not stationary and is moved at the high speed relatively to the transmitter, the channel in the duration of one OFDM useful symbol is no longer kept in the fixed state, thereby causing the time-selective fading channel. Due to the influence of the Doppler effect at the high speed motion, the OFDM signal is positively or negatively offset by one time of Doppler frequency ($f_d$) with the center carrier frequency ($f_c$) serving as the center. This offset is unfavorable to a multicarrier modulation system, and may cause the inter-carrier interference (ICI) effect that destroys the orthogonality of the sub-carriers, hence resulting in an error floor phenomenon in the performance of bit error rate (BER).

The ICI cancellation method is disclosed in US patent US 2006/0239367 A1. Combination of the windowing (e.g. 2-step/4-step windowing) and one parallel interference cancellation (PIC) equalizer is proposed of the OFDM system. In the receiver, the information of maximum channel delay is estimated to determine the information of the inter-symbol interference free (ISI-free) region and a set of 2-step/4-step windowing coefficients. According to the information of the ISI-free region, the time-domain received signal samples are multiplied by windowing coefficients, which do combination in the time domain. The combined signal is transformed into frequency domain signal by fast Fourier transformer (FFT) and then operates to cancel ICI effect by the PIC equalizer. This PIC equalizer estimates all the transmitted data according to one-tap least square (LS) zero forcing (ZF) or minimum mean square error (MMSE) filtering rule, and then performs the ICI reconstruction and cancellation operations over one unit time. The PIC equalizer has the advantages of the high operation speed, but tends to generate the estimation error with respect to the data on the sub-carrier with low signal to interference-pulse-noise ratio (SINR), thereby decreasing the accuracy of data detection.

The IEEE Transactions on Communications, Vol. 49, PP. 1375-1387, August 2001, disclose an ICI cancellation method. In this article, a successive interference cancellation (SIC) equalizer is adopted to replace the conventional equalizer, which does not consider the ICI effect. This SIC equalizer arranges the order of detecting the data on the sub-carriers according to the SINR of each sub-carrier, and then performs the data detection in order. As the SIC equalizer detects the data of one sub-carrier, the reconstruction and cancellation operations of the corresponding ICI effect are performed. Because the data detection is performed according to the order of the SINRs, the accuracy of data detection is enhanced, the accuracy of reconstructed ICI is relatively enhanced, the estimated error rate of the received signal with the lower SINR after the ICI effect is cancelled is decreased, and the performance after the ICI effect is cancelled is enhanced. However, assume the number of total sub-carriers is N, SIC equalizer needs to perform the inverse matrix operation for the size of N×N to estimate the data on the sub-carrier by using MMSE filtering rule, and performs N times of the successive interference cancellation operations according to the order of SINRs mechanism. So the overall calculation loading is relatively high, $O(N^4)$ complex multiplication operations are needed. Besides, the operation processing speed is relatively slow, hence the complexity of hardware implementation is too high.

The IEEE Transactions on Consumer Electronics, Vol. 5, PP. 2528-2532, May 2006, further disclose an improved SIC equalizer. This improved SIC equalizer directly chooses the values on the diagonal lines in the frequency domain channel matrix for the magnitude sorting, thereby decreasing the calculation complexity as compared with the SINR sorting. Meanwhile, it is observed, from the frequency domain channel matrix, that the non-zero values caused by its ICI effect in the frequency domain channel matrix distribute over the neighboring D sub-carrier data on the diagonal lines. And, the value of D is much smaller than the number of total sub-carriers (N). The frequency domain channel matrix could be regarded as a sparse matrix. When an inverse matrix operation is used to estimate data for MMSE filtering rule, the original frequency domain channel matrix with the size of N×N may be simplified into the frequency domain channel matrix with the size of (2D+1)×(4D+1) according to this property, thereby reducing the calculation complexity. Next, by using MMSE filtering rule, this improved SIC equalizer estimates the data according to the sorting result. Although the calculation complexity of this improved SIC equalizer has been reduced, the greater value of D is still needed to enhance the system performance because its ICI effect is not further centralized on the neighboring sub-carrier data. Thus, its calculation complexity is moderate. Meanwhile, N times of inter-carrier interference reconstruction and cancellation operations still have to be performed successively, so the operation processing speed is low.

SUMMARY

The invention is directed to an apparatus and a method for inter-carrier interference cancellation using the time-domain multi-step windowing technology in conjunction with the overlapped parallel multi-block SIC technology to solve the ICI effect, and effectively enhance the performance of the orthogonal frequency division multiplexing system and reduce complexity of calculation in the high mobility environment.

According to a first aspect of the present disclosure, an apparatus for inter-carrier interference cancellation is provided. The apparatus includes an ISI-free region detector, a multi-step windowing adjuster, a time domain combiner, a fast Fourier transformer, a channel estimator and an overlapped parallel multi-block SIC equalization unit. The ISI-free region detector detects a time-domain received signal to obtain information of an ISI-free region of the time-domain received signal. The multi-step windowing adjuster obtains a plurality of cyclic useful symbols from the time-domain received signal according to the information of the ISI-free region, generates a set of multi-step windowing coefficients (e.g. (q+1)-step windowing, let the ISI-free region includes q samples), and obtains a plurality of adjusted cyclic useful symbols by multiplying the cyclic useful symbols by the set of multi-step windowing coefficients, respectively. The time domain combiner combines the adjusted cyclic useful symbols in a time domain to obtain a time-domain combination signal. ICI of each of sub-carriers of the time-domain combination signal is centralized on neighboring D sub-carriers. The fast Fourier transformer transforms the time-domain combination signal into a frequency-domain received signal. The channel estimator estimates to obtain a channel response matrix corresponding to the frequency-domain received signal. The overlapped parallel multi-block SIC equalization unit divides the frequency-domain received signal and the corresponding channel response matrix into a plurality of overlapped signal blocks according to a value of D, and performs successive ICI cancellation on each of the signal blocks in parallel to obtain estimation data.

According to a second aspect of the present disclosure, a method for low complexity ICI cancellation is provided. The method includes the steps of: detecting a time-domain received signal to obtain information of an ISI-free region of the time-domain received signal; obtaining a plurality of cyclic useful symbols from the time-domain received signal according to the information of the ISI-free region, generating a set of multi-step windowing coefficients, and obtaining a plurality of adjusted cyclic useful symbols by multiplying each of the cyclic useful symbols by the set of multi-step windowing coefficients, respectively; combining the adjusted cyclic useful symbols in a time domain to obtain a time-domain combination signal, wherein ICI of each of sub-carriers of the time-domain combination signal is centralized on neighboring D sub-carriers; transforming the time-domain combination signal into a frequency-domain received signal; estimating to obtain a channel response matrix corresponding to the frequency-domain received signal; and dividing the frequency-domain received signal and the corresponding channel response matrix into a plurality of overlapped signal blocks according to a value of D, and respectively performing successive ICI cancellation on each of the signal blocks in parallel to obtain estimation data.

The invention will become apparent from the following detailed description of the preferred but non-limiting embodiments. The following description is made with reference to the accompanying drawings.

BRIEF DESCRIPTION OF THE DRAWINGS

FIGS. 6A and 6B are schematic illustrations showing the selection and overlapping processes of the signal blocks according to the preferred embodiment.

DETAILED DESCRIPTION

The invention provides an apparatus and a method for inter-carrier interference (ICI) cancellation using the time-domain multi-step windowing technology in conjunction with the overlapped parallel multi-block SIC technology to solve the ICI effect, and effectively enhance the performance of the orthogonal frequency division multiplexing system and reduce complexity of calculation in the high-speed motion environment.

Figure 1:
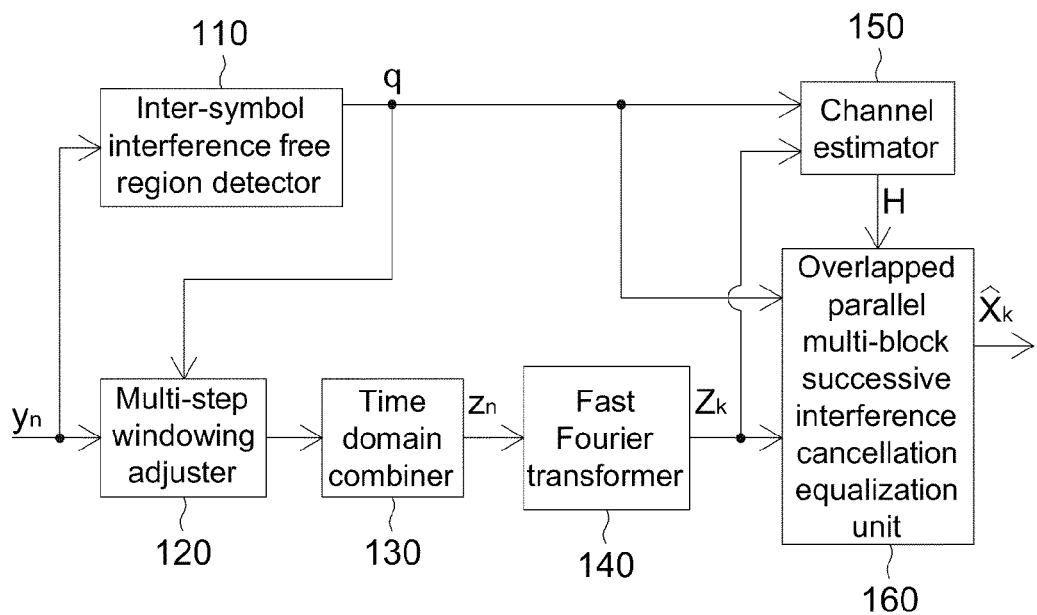
FIG. 1 is a block diagram showing an apparatus for ICI cancellation according to a preferred embodiment.
Figure 2:
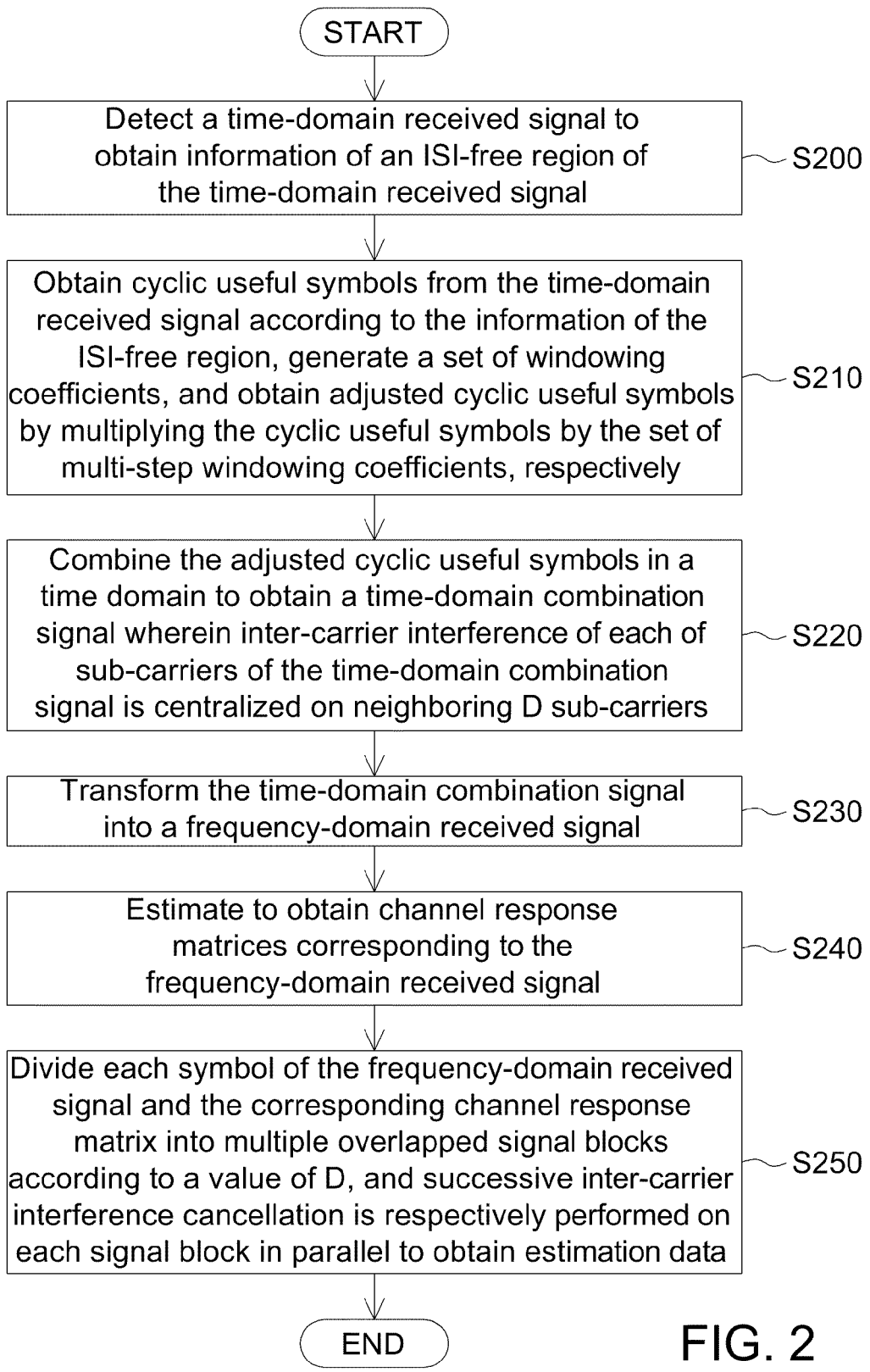
FIG. 2 is a flow chart showing a method for ICI cancellation according to the preferred embodiment.

FIG. 1 is a block diagram showing an apparatus 100 for ICI cancellation according to a preferred embodiment of the disclosure. Referring to FIG. 1, the apparatus 100 for ICI cancellation includes an inter-symbol interference free (ISI-free) region detector 110, a multi-step windowing adjuster 120, a time domain combiner 130, a fast Fourier transformer 140, a channel estimator 150 and an overlapped parallel multi-block SIC equalization unit 160. FIG. 2 is a flow chart showing a method for ICI cancellation according to the preferred embodiment of the disclosure. First, in step S200, the ISI-free region detector 110 detects a time-domain received signal $y_n$ to obtain information of the ISI-free region, which includes the position information and the duration of the ISI-free region, wherein the ISI-free region includes q samples.

Figure 3:
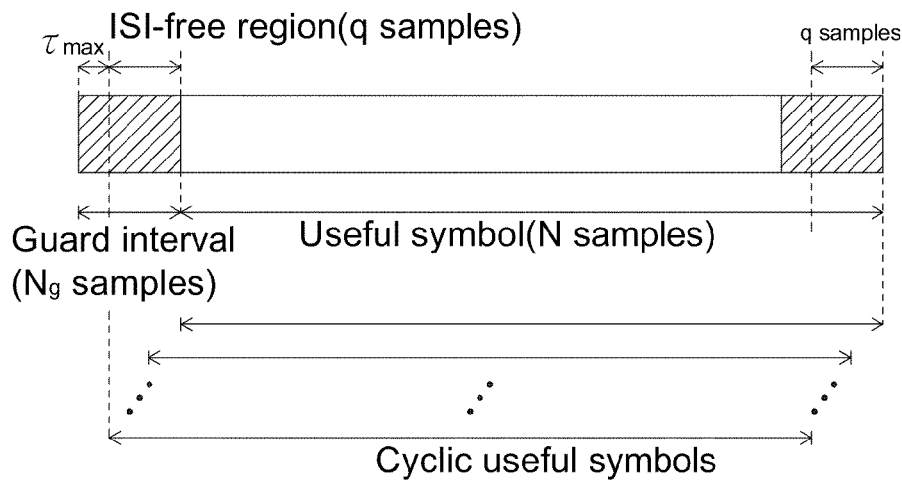
FIG. 3 is a schematic illustration showing an OFDM symbol.

FIG. 3 is a schematic illustration showing an OFDM symbol. In order to fight against the multipath reflection effect in the OFDM system, the transmitter copies a guard interval (GI) with a cyclic prefix property to the front of each useful symbol in the time domain to form a complete OFDM symbol. The guard interval includes $N_g$ samples, and the useful symbol includes N samples. When the maximum channel delay $\tau_{max}$ is smaller than the duration of GI, the receiver can avoid the ISI effect. In the typical high-speed motion environment, $\tau_{max}$ is smaller than the duration of GI, hence the ISI-free region exists. So, many sets of cyclic useful symbols are available. Preferably, the step S200 of this embodiment can utilize the method of detecting the ISI-free region, disclosed in U.S. Pat. No. 7,310,393, to enhance the accuracy of detecting the ISI-free region.

In step S210, the multi-step windowing adjuster 120 obtains (q+1) cyclic useful symbols from the time-domain received signal $y_n$ according to the information of the ISI-free region with duration of q samples, and generates a set of multi-step windowing coefficients $w_d$ where $d=-q\sim 0$, and obtains multiple adjusted cyclic useful symbols by multiplying the cyclic useful symbols with the set of multi-step windowing coefficients, respectively. The multi-step windowing adjuster 120 obtains the corresponding cyclic useful symbols $y_n^{(d)}$, with the duration of the useful symbol, starting from the ISI-free region in each OFDM symbol of the time-domain received signal. The cyclic useful symbols $y_n^{(d)}$ is expressed by Equation (1).

$$y_n^{(d)} = \{y_n\}_{n=d}^{N-1+d} \text{ where } d=-q\sim 0 \quad (1)$$

The multi-step windowing adjuster 120 generates a set of multi-step windowing coefficients according to the duration of the ISI-free region, and obtains multiple adjusted cyclic useful symbols by multiplying the cyclic useful symbols $y_n^{(d)}$ by the set of multi-step windowing coefficients in the time domain, respectively. The summation of the multiple adjusted cyclic useful symbols can be regarded as the product of the time-domain received signal $y_n$ and the window weightings $w(n)$ where $n=-q, -q+1, \ldots, N-1$.

Figure 4:
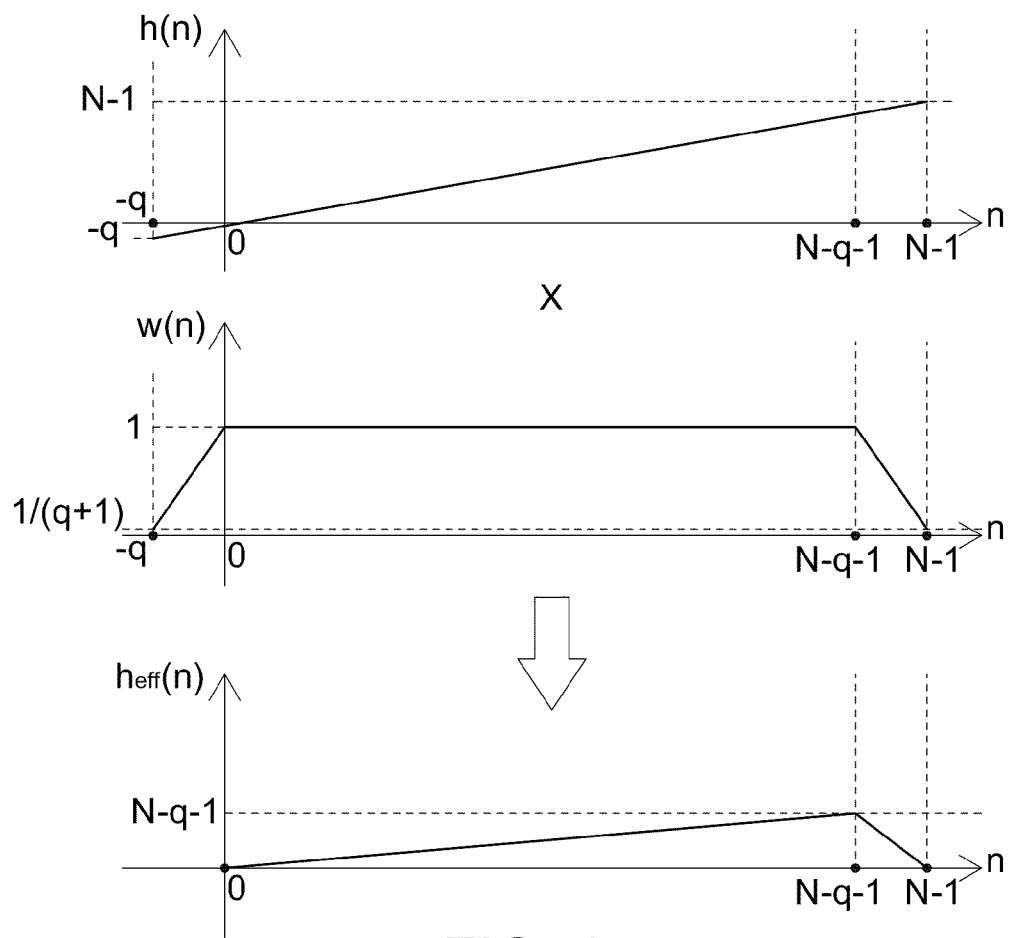
FIG. 4 is a schematic illustration showing an example of the corresponding window weighting w(n) of the equal-weighted (q+1)-step windowing and the linear time-variant channel according to the preferred embodiment.

In this non-restrictive example, the set of windowing coefficients is a set of equal-weighted $(q+1)$-step windowing. The corresponding window weightings $w(n)$ of the equal-weighted $(q+1)$-step windowing has $(N+q)$ weightings, and the foremost $q$ windowing weightings are successively $1/(q+1), 2/(q+1), \ldots, q/(q+1)$, the middle $(N-q)$ windowing weightings are equal to 1, and the last $q$ windowing weightings are successively $q/(q+1), (q-1)/(q+1), \ldots, 1/(q+1)$. That is, the sum of each the foremost $q$ windowing weightings and the corresponding last $q$ windowing weightings is equal to 1. FIG. 4 is a schematic illustration showing an example of the corresponding window weightings $w(n)$ of equal-weighted $(q+1)$-step windowing and the linear time-variant channel according to the preferred embodiment of the invention. In FIG. 4, $w(n)$ is the corresponding window weightings of equal-weighted $(q+1)$-step windowing, and $h(n)$ is a channel response and may be assumed to be the one-tap linear time variation in the typical range of the vehicle speed. As shown in FIG. 4, it is obtained that, after the equal-weighted $(q+1)$-step windowing and the time-domain combination operations have been processed, the time-varying effect of the effective time-variant channel $h_{\textit{eff}}(n)$ can be alleviated in the duration of one useful symbol. That is, a portion of the ICI effect is alleviated. Meanwhile, the ICI of each of the sub-carriers of the time domain combination hereinafter is centralized on the neighboring D sub-carriers after the equal-weighted $(q+1)$-step windowing and the time domain combination operations are processed, and it is advantageous to the simplification of the next stage of frequency domain equalizer and the enhancement of the system performance.

In step S220, the time domain combiner 130 combines the adjusted cyclic useful symbols in the time domain to obtain a time-domain combination signal $z_n$. The ICI of each of sub-carriers of the time-domain combination signal $z_n$ is centralized on neighboring D sub-carriers. The time domain combiner 130 substantially delays the adjusted cyclic useful symbols by duration of the useful symbol to obtain delayed adjusted cyclic useful symbols, summates the delayed adjusted cyclic useful symbols and the adjusted cyclic useful symbols together, and then selects the portion of the useful symbol location of the summed signal to obtain the time-domain combination signal $z_n$ in the time domain. The time-domain combination signal $z_n$ is expressed by Equation (2).

$$z_n = \sum_{d=-q}^{0} w_d \tilde{y}_{n-d}^{(d)} \quad (2)$$

where $$\tilde{y}_{n-d}^{(d)} \triangleq y_{n-d}^{(d)}$$

and $(.)_N$ denotes modulo $N$ operation.

In step S230, the fast Fourier transformer 140 transforms the time-domain combination signal $z_n$ into a frequency-domain received signal $Z_k$, as expressed in Equation (3), wherein $x_n$ is the time-domain transmitted signal, and $h_n^{(l)}$ and $\tau^{(l)}$ are the fading gain and delay spread of the l-th time-variant path, respectively.

$$Z_k = \sum_{d=-q}^{o} w_d Y_k^{(d)} e^{-j\frac{2\pi k d}{N}} \quad (3)$$

where $$Y_k^{(d)} = FFT\{y_n^{(d)}\}$$

and $$y_n^{(d)} = \sum_{l=1}^{L} h_{n+d}^{(l)} \tilde{x}_{n+d-\tau^{(l)}}$$

Next, the frequency-domain received signal $Z_k$ is checked and analyzed. First, the frequency-domain received signal $Z_k$ is further simplified to obtain Equation (4).

$$Z_k = X_k \left\{ \sum_{l=1}^{L} \left[ \sum_{d=-q}^{0} w_d h_{k,k}^{(l,d)} \right] e^{-j\frac{2\pi k \tau^{(l)}}{N}} \right\} + \sum_{\substack{m=0 \\ (m \neq k)}}^{N-1} X_m \left\{ \sum_{l=1}^{L} \left[ \sum_{d=-q}^{0} w_d h_{k,m}^{(l,d)} e^{j\frac{2\pi (m-k)d}{N}} \right] e^{-j\frac{2\pi m \tau^{(l)}}{N}} \right\} \quad (4)$$

where $$h_{k,m}^{(l,d)} = \frac{1}{N} \sum_{n=0}^{N-1} h_{n+d}^{(l)} e^{-j\frac{2\pi n(m-k)}{N}}$$

According to Equation (4), it is obtained that the frequency-domain received signal $Z_k$ is simplified into the desired data item and the ICI item. Because the time-variant channel is assumed to be the one-tap linear time variation, i.e. $h_n^{(l)} = c_1^l n + c_0^l$, the sub-items in the ICI item of Equation (4) may be further simplified into Equation (5).

$$\sum_{d=-q}^{0} w_d h_{k,m}^{(l,d)} e^{j\frac{2\pi(m-k)d}{N}} = h_{k,m}^{(l)} \sum_{d=-q}^{0} w_d e^{j\frac{2\pi(m-k)d}{N}} \quad (5)$$

where $$h_{k,m}^{(l)} = [c_1^l N] \cdot \left[ \frac{1}{N} \frac{-1}{1 - e^{j\frac{2\pi(m-k)}{N}}} \right]$$

In the case of equal-weighted $(q+1)$-step windowing coefficients, i.e. $w_d$ are constant values, the summation term in Equation (5) may be regarded as the summation of phasors with the same magnitude but different phases. It is observed that the magnitude of the phasors sum is significantly decreased when the rotation of the multiple phasors exceeds a circle, and the corresponding ICI effect may be neglected. If the |m−k| is larger than D where D=N/q, the rotation of multiple phasors exceeds a circle, and it is proved that the ICI effect of the step S220 is centralized on the neighboring D sub-carriers. The value of D may be defined, according to Equation (5), to be the duration of the useful symbol divided by the duration of the ISI-free region, that is, D=N/q.

In step S240, the channel estimator 150 estimates to obtain a channel response matrix H corresponding to the frequency-domain received signal $Z_k$. In step S250, the overlapped parallel multi-block SIC equalization unit 160 divides the frequency-domain received signal $Z_k$ and the corresponding channel response matrix H into multiple overlapped signal blocks according to the value of D, and performs the successive ICI cancellation on each of the signal blocks in parallel to obtain estimation data $\hat{X}_k$.

Figure 5:
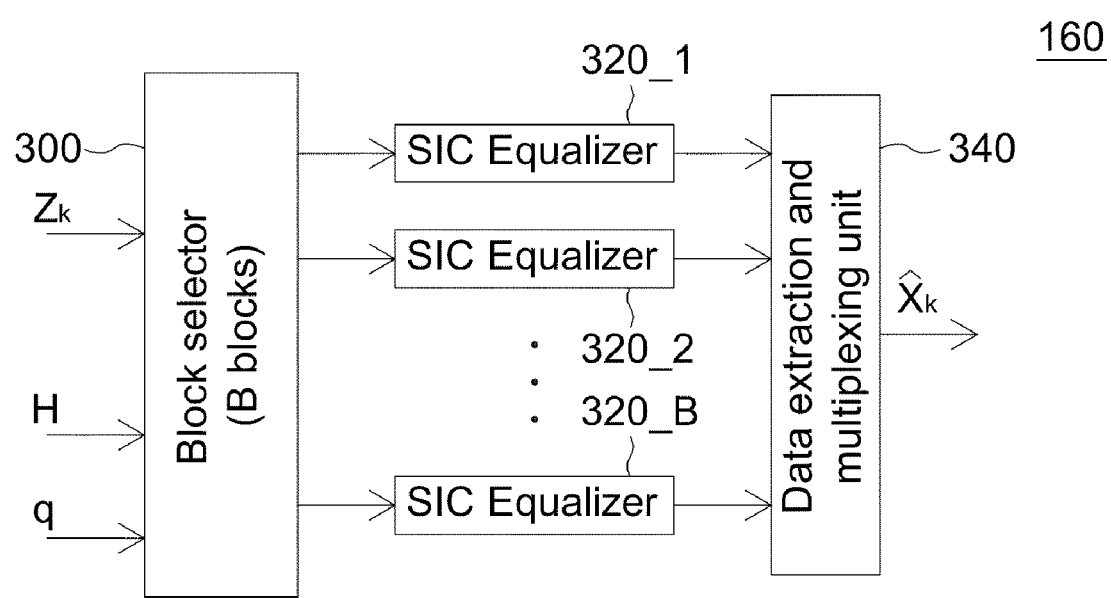
FIG. 5 is a block diagram showing an overlapped parallel multi-block SIC equalization unit according to the preferred embodiment.

FIG. 5 is a block diagram showing the overlapped parallel multi-block SIC equalization unit according to the preferred embodiment of the disclosure. Referring to FIG. 5, the overlapped parallel multi-block SIC equalization unit 160 includes a block selector 300, B successive interference cancellation (SIC) equalizers 320_1 to 320_B and a data extraction and multiplexing unit 340. The block selector 300 determines an overlap number (also referred to as the number of overlap) olp and a signal block number (also referred to as the number of signal blocks) B according to the value of D, divides the frequency-domain received signal $Z_k$ and the corresponding channel response matrix H according to the signal block number B, and then obtains multiple overlapped signal blocks according to the overlap number olp. Considering that the ICI effect is centralized on the neighboring D sub-carriers, the block selector 300 determines the signal block number B to divide the frequency-domain received signal $Z_k$ and the estimated corresponding channel response matrix H into B signal blocks. Also, considering that the data on the boundary of each of the signal blocks are influenced by the ICI effect of the neighboring signal blocks to cause the data detection error, the block selector 300 determines the overlap number olp according to the value of D to add olp overlapped signals to the boundary of the signal block. That is, each overlapped signal block includes the corresponding divided signals and the edge portions of the neighboring signal blocks.

Figures 6A, 6B:
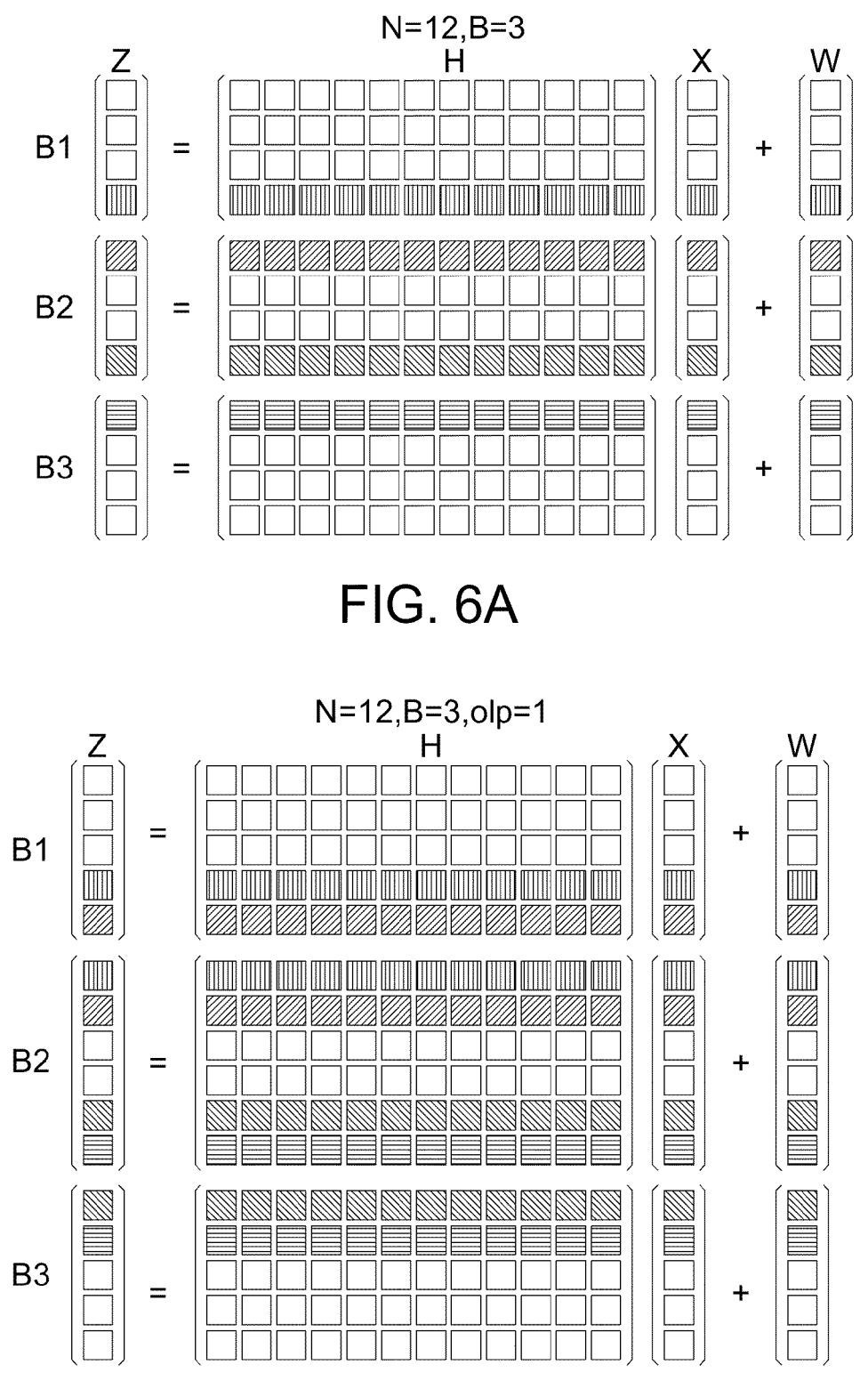

Because the ICI effect has been centralized on the neighboring D sub-carriers, the overlap number olp is not larger than the value of D. In addition, considering the increased computation complexity caused by the overlapped signals added to the boundary of the signal block, the signal block number is defined to be smaller than the duration of the useful symbol divided by two times of the overlap number, that is, B<N/(2×olp). FIGS. 6A and 6B are schematic illustrations showing the selection and overlapping processes of the signal blocks according to the preferred embodiment of the disclosure. In the illustrated example, N is 12, B is 3 and olp is 1. In FIGS. 6A and 6B, Z is the frequency-domain received signal $Z_k$ for k=0~N−1, H is the estimated corresponding channel response matrix, X is the frequency-domain estimation data, and W is the white Gaussian noise. In FIG. 6A, the frequency-domain received signal and the channel response matrices are divided into three signal blocks B1 to B3, wherein the data on the boundary of the signal block are influenced by the ICI effect of the neighboring signal blocks, for example, the region filled with straight lines and the region filled with right sloped lines affect each other, and the region filled with left sloped lines and the region filled with transversal lines affect each other. Therefore, the signal block B1 expands to include the signals of the regions filled with the right sloped lines, the signal block B2 expands to include the signals of the regions filled with the straight lines and the signals of the regions filled with the transversal lines, and the signal block B3 expands to include the signals of the regions filled with the left sloped lines in FIG. 6B.

Thereafter, the SIC equalizers 320_1 to 320_B respectively and simultaneously perform the successive ICI cancellation on the divided B overlapped signal blocks to obtain the sub-estimation data corresponding to each signal block. Each signal block performs the successive detection on the data and the successive ICI reconstruction and cancellation operations through the corresponding SIC equalizer. The SIC equalizers 320_1 to 320_B can substantially utilize the MMSE filtering rule to estimate the data, using the corresponding frequency domain channel matrix with the size of (2D'+1)×(4D'+1). Because of the effectiveness of the centralized ICI effect, the value of D' may be selected to be 0 or 1, which cannot be exceeded by the prior art. Consequently, the overall calculation complexity is decreased and the operation processing speed is increased without degrading the system performance.

Finally, the data extraction and multiplexing unit 340 extracts the sub-estimation data, obtained by the SIC equalizers 320_1 to 320_B, and synthesizes the data to obtain the estimation data $\hat{X}_k$. The data extraction and multiplexing unit 340 discards the foremost and the last corresponding overlap number of portions in the sub-estimation data, and synthesizes the remaining portion of the sub-estimation data to obtain the estimation data $\hat{X}_k$ satisfying the useful symbol format organized at the transmitter.

Figure 7:
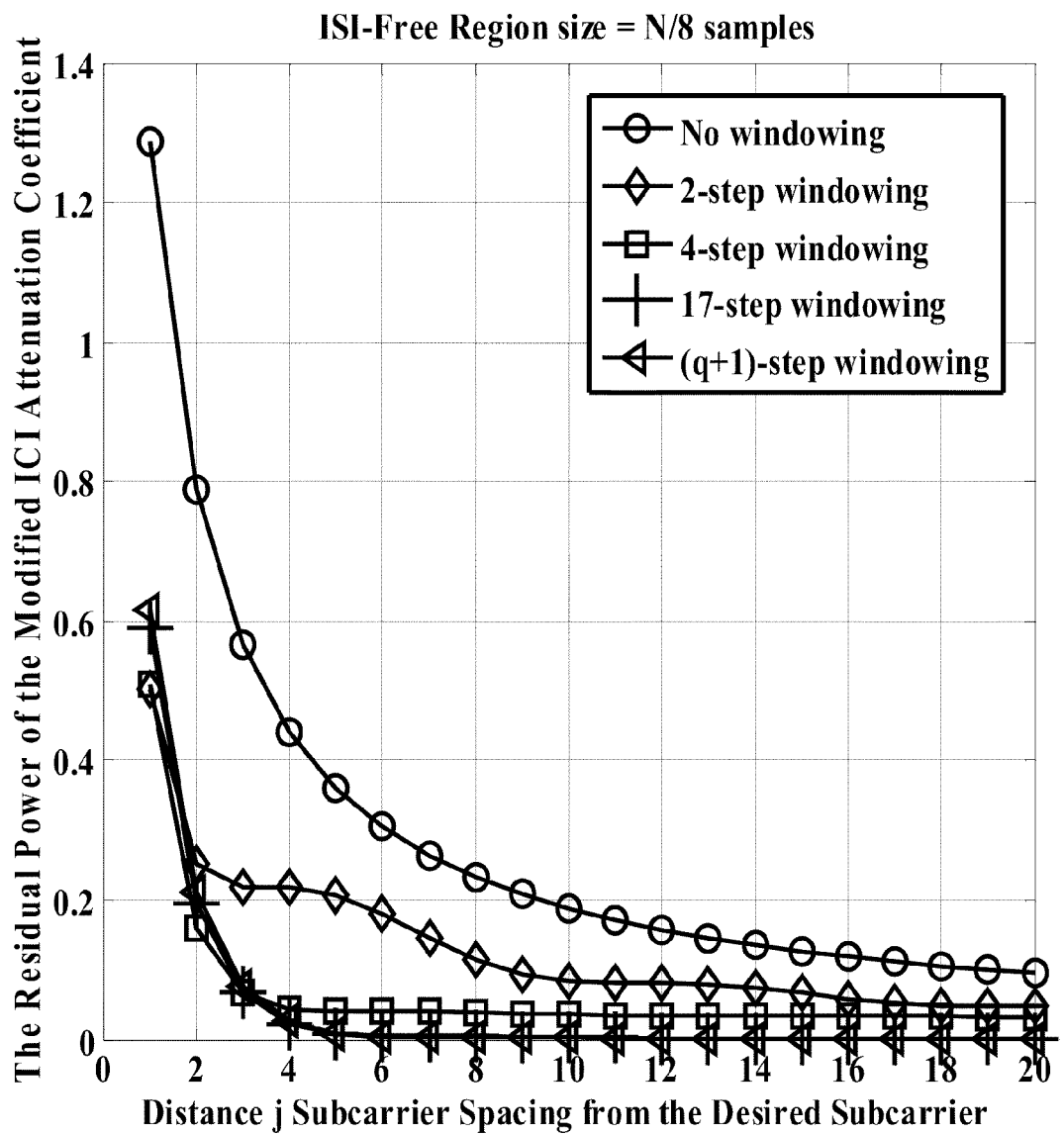
FIG. 7 is a simulated diagram showing the ICI energy effect centralization corresponding to five different windowing cases with equal weighting according to the preferred embodiment.

FIG. 7 is a simulated diagram showing the ICI energy effect centralization corresponding to five different windowing cases with equal weighting according to the preferred embodiment of the disclosure. In this embodiment, the ICI effect of each sub-carrier of the time-domain combination signal is centralized on the neighboring D sub-carriers after the multi-step windowing and time domain combination operations as long as the number of steps (i.e., the number of non-zero $w_d$) is large enough, where D=N/(2q). The parameter of q is equal to N/8 in FIG. 7, hence D(=N/2q) is equal to 4. It is observed from FIG. 7 that the residual ICI power is almost constant and neglected when |m−k|=j≧D for the 17-step and (q+1)-step windowing cases.

Figure 8:
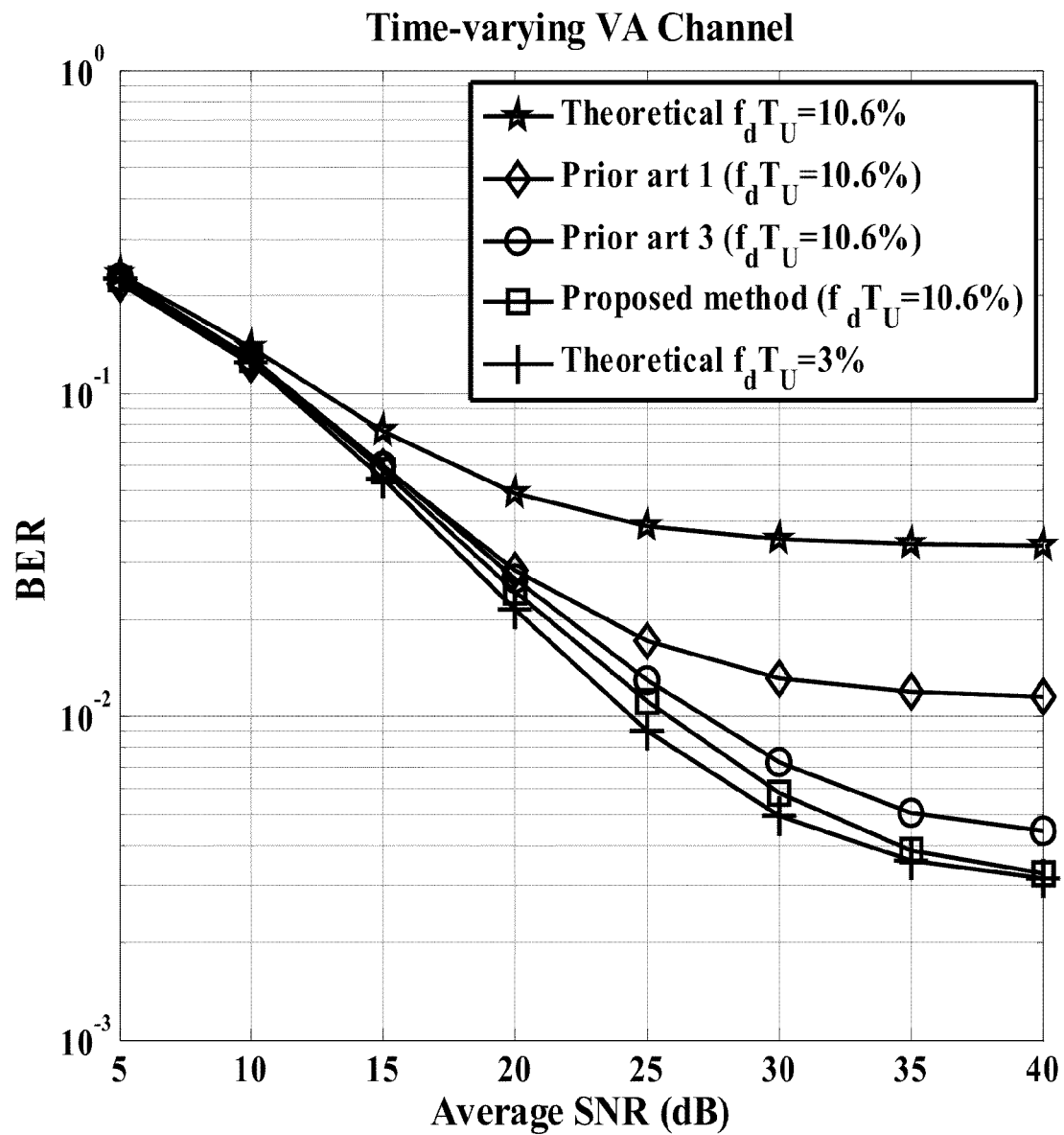
FIG. 8 is a simulated diagram showing the performance comparisons among the two prior art methods and the proposed method according to the preferred embodiment.
Figure 9:
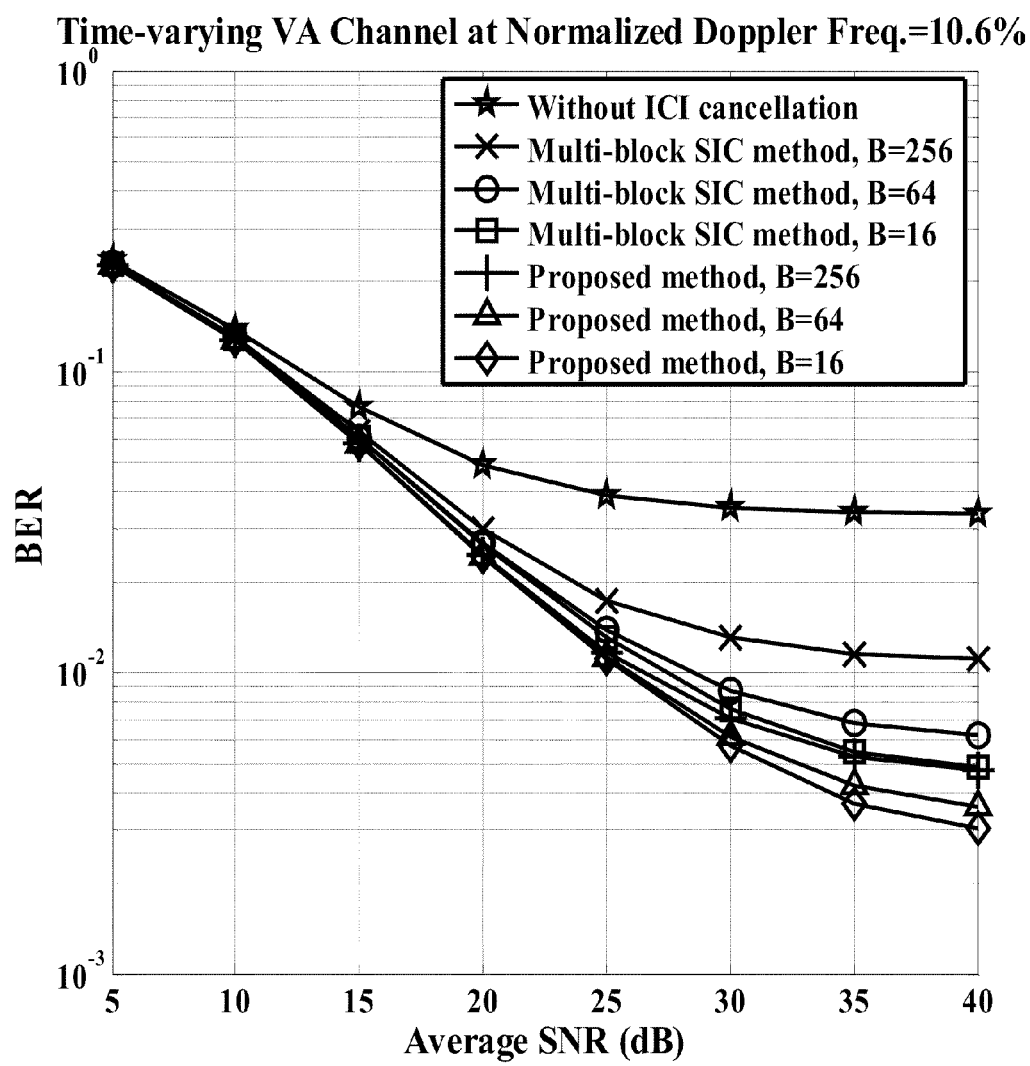
FIG. 9 is a simulated diagram showing the performance comparisons between the multi-block SIC method and the proposed method at the different parameters of block number B according to the preferred embodiment.

FIG. 8 is a simulated diagram showing the performance comparisons among the two prior art methods and the proposed method according to the preferred embodiment of the disclosure. As shown in FIG. 8, it is observed that the disclosure can reduce the ICI effect to the normalized Doppler frequency ($f_dT_u$) of about 3% with respect to the initial normalized Doppler frequency of 10.6% in the time-variant vehicle A (VA) channel. It corresponds to the receiver having the motion speed of 500 KM/hour and the central carrier frequency of 2.56 GHz, but the residual ICI effect only corresponds to the motion speed of 140 KM/hour by using the proposed method and the performance is significantly improved. In addition, compared with the two prior art methods, the gain in SNR for the disclosure is also increased with respect to the BER of $10^{-2}$ before the channel coding scheme. In addition, FIG. 9 is a simulated diagram showing the performance comparisons between multi-block SIC method and the proposed method according to the preferred embodiment of the disclosure. As shown in FIG. 9, when the number of signal block processed in parallel gets higher, the system performance is suddenly decreased or even cannot reach the system requirement (i.e. BER=$10^{-2}$) if the use of the overlapping is not considered at each signal block although the processing speed is increased. However, when the overlapping is being considered, the additionally paid calculation complexity has to be simultaneously considered. When the number of signal blocks processed in parallel gets higher, the paid calculation complexity is also increased, but the performance is decreased slowly. Therefore, properly considering the overlap number olp and the signal block number B can make the overall system reach the optimum performance in the preferred embodiment of the disclosure.

The apparatus and method for inter-carrier interference cancellation according to the embodiment of the disclosure have many advantages, some of which will be described in the following.

The apparatus and method for inter-carrier interference cancellation according to the invention use the time-domain multi-step windowing technology to combine with the cyclic useful symbols in the time domain so that a portion of the ICI effect caused by the Doppler effect can be automatically cancelled, and the ICI effect can be much more centralized on the neighboring several pieces of sub-carrier data. In addition, the ICI effect centralization parameter D and the parameters (B, olp, and D') required in the overlapped parallel SIC equalizer are selected in the frequency domain, and the system parameters are optimized using the parallel processing and the overlap concept. So, the overlapped parallel multi-block SIC technology may be adopted to solve the ICI effect, and effectively enhance the performance of the orthogonal frequency division multiplexing system in the high-speed motion environment. So, the invention has the advantages of the simple and low complexity structure, the high operation processing speed and the good ability of canceling the ICI, and the system performance of the OFDM system in the high-speed motion environment may be thus enhanced.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An apparatus for inter-carrier interference cancellation, the apparatus comprising:
   an inter-symbol interference free region detector for detecting a time-domain received signal to obtain information of an inter-symbol interference free region of the time-domain received signal;
   a multi-step windowing adjuster for obtaining a plurality of cyclic useful symbols from the time-domain received signal according to the information of the inter-symbol interference free region, generating a set of multi-step windowing coefficients, and obtaining a plurality of adjusted cyclic useful symbols by multiplying the cyclic useful symbols by the set of multi-step windowing coefficients, respectively;
   a time domain combiner for combining the adjusted cyclic useful symbols in a time domain to obtain a time-domain combination signal, wherein inter-carrier interference of each of sub-carriers of the time-domain combination signal is centralized on neighboring D sub-carriers;
   a fast Fourier transformer for transforming the time-domain combination signal into a frequency-domain received signal;
   a channel estimator for estimating to obtain a channel response matrix corresponding to the frequency-domain received signal; and
   an overlapped parallel multi-block successive interference cancellation (SIC) equalization unit for dividing the frequency-domain received signal and the corresponding channel response matrix into a plurality of overlapped signal blocks according to a value of the D, and performing successive inter-carrier interference cancellation on each of the signal blocks in parallel to obtain estimation data.

2. The apparatus according to claim 1, wherein the set of multi-step windowing coefficients is a set of (q+1)-step windowing coefficients when the ISI-free region includes q samples.

3. The apparatus according to claim 1, wherein each of the cyclic useful symbols is a cyclic-shifted version of a useful symbol.

4. The apparatus according to claim 1, wherein the time domain combiner delays the adjusted cyclic useful symbols by duration of a useful symbol to obtain delayed adjusted cyclic useful symbols, summates the delayed adjusted cyclic useful symbols and the adjusted cyclic useful symbols together, and then selects a portion of the useful symbol location of the summed signal to obtain the time-domain combination signal.

5. The apparatus according to claim 1, wherein the value of the D is obtained by dividing duration of the useful symbol by duration of the inter-symbol interference free region.

6. The apparatus according to claim 1, wherein the overlapped parallel multi-block SIC equalization unit comprises:
   a block selector for determining an overlap number and a signal block number according to the value of the D, dividing the frequency-domain received signal and the corresponding channel response matrix according to the signal block number, and then obtaining the overlapped signal blocks according to the overlap number;
   a plurality of successive interference cancellation equalizers for respectively and simultaneously performing the successive inter-carrier interference cancellation on the overlapped signal blocks to obtain sub-estimation data corresponding to each of the signal blocks; and
   a data extraction and multiplexing unit for extracting the sub-estimation data and synthesizing to obtain the estimation data.

7. The apparatus according to claim 6, wherein the overlap number is not larger than the value of the D.

8. The apparatus according to claim 6, wherein the signal block number is smaller than duration of the useful symbol divided by two times of the overlap number.

9. The apparatus according to claim 6, wherein each of the signal blocks comprises portions of corresponding divided signals and the edge portions of the neighboring signal blocks.

10. The apparatus according to claim 6, wherein the data extraction and multiplexing unit discards the edge portions corresponding to the overlap number of the sub-estimation data for each signal block, and synthesizes a remaining portion of the sub-estimation data for all the signal blocks to obtain the estimation data.

11. A method for inter-carrier interference cancellation, the method comprising the steps of:
   detecting a time-domain received signal to obtain information of an inter-symbol interference free region of the time-domain received signal;
   obtaining a plurality of cyclic useful symbols from the time-domain received signal according to the information of the inter-symbol interference free region, generating a set of multi-step windowing coefficients, and obtaining a plurality of adjusted cyclic useful symbols by multiplying each of the cyclic useful symbols by the set of multi-step windowing coefficients, respectively;

combining the adjusted cyclic useful symbols in a time domain to obtain a time-domain combination signal, wherein inter-carrier interference of each of sub-carriers of the time-domain combination signal is centralized on neighboring D sub-carriers;

transforming the time-domain combination signal into a frequency-domain received signal;

estimating to obtain a channel response matrix corresponding to the frequency-domain received signal; and dividing the frequency-domain received signal and the corresponding channel response matrix into a plurality of overlapped signal blocks according to a value of the D, and respectively performing successive inter-carrier interference cancellation on each of the signal blocks in parallel to obtain estimation data.

12. The method according to claim 11, wherein the set of multi-step windowing coefficients is a set of (q+1)-step windowing coefficients when the ISI-free region includes q samples.

13. The method according to claim 11, wherein each of the cyclic useful symbols is a cyclic-shifted version of a useful symbol.

14. The method according to claim 11, wherein the step of combining in the time domain comprises:

delaying the adjusted cyclic useful symbols by duration of a useful symbol to obtain delayed adjusted cyclic useful symbols and summating the delayed adjusted cyclic useful symbols and the adjusted cyclic useful symbols together; and selecting a portion of the useful symbol location of the summed signal to obtain the time-domain combination signal.

15. The method according to claim 11, wherein the value of the D is obtained by dividing duration of the useful symbol by duration of the inter-symbol interference free region.

16. The method according to claim 11, wherein the step of obtaining the estimation data comprises:

determining an overlap number and a signal block number according to the value of the D;

dividing the frequency-domain received signal and the corresponding channel response matrix according to the signal block number;

obtaining the overlapped signal blocks by expansion according to the overlap number;

respectively and simultaneously performing the successive inter-carrier interference cancellation on the signal blocks to obtain sub-estimation data corresponding to each of the signal blocks; and extracting the sub-estimation data and synthesizing to obtain the estimation data.

17. The method according to claim 16, wherein the overlap number is not larger than the value of the D.

18. The method according to claim 16, wherein the signal block number is smaller than the duration of the useful symbol divided by two times of the overlap number.

19. The method according to claim 16, wherein each of the signal blocks comprises portions of corresponding divided signals and the edge portions of the neighboring signal blocks.

20. The method according to claim 16, wherein the edge portions corresponding to the overlap number in the sub-estimation data is discarded for each signal block, and a remaining portion of the sub-estimation data for all the signal blocks is synthesized to obtain the estimation data.

* * * * *